US012753044B2

(12) United States Patent
Auxier et al.

(10) Patent No.: US 12,753,044 B2
(45) Date of Patent: Oct. 6, 2026

(54) MULTI-STAGE DETECTION TRIGGER FOR HUMAN SENSING

(71) Applicant: OTIS ELEVATOR COMPANY, Farmington, CT (US)

(72) Inventors: James Tilsley Auxier, Palm Beach Gardens, FL (US); Kathleen Nicole Moore, West Hartford, CT (US); Randy Roberts, Hebron, CT (US); Johanna Whitwell, Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 762 days.

(21) Appl. No.: 18/333,090

(22) Filed: Jun. 12, 2023

(65) Prior Publication Data

US 2024/0409364 A1 Dec. 12, 2024

(51) Int. Cl.

| | |
|---|---|
| ***B66B 3/00*** | (2006.01) |
| ***B66B 3/02*** | (2006.01) |
| ***B66B 5/00*** | (2006.01) |

(52) U.S. Cl.

CPC .............. *B66B 5/0031* (2013.01); *B66B 3/02* (2013.01)

(58) Field of Classification Search

CPC ................................ B66B 5/0031; B66B 3/02

USPC ........................................................ 187/393

See application file for complete search history.

(56) References Cited

U.S. PATENT DOCUMENTS

| | | | | |
|---|---|---|---|---|
| 6,202,797 | B1 * | 3/2001 | Skolnick | B66B 5/005 187/391 |
| 2002/0166732 | A1 * | 11/2002 | Horbrugger | B66B 13/22 187/316 |
| 2011/0202178 | A1 | 8/2011 | Zhen et al. | |
| 2012/0018256 | A1 | 1/2012 | Mangini et al. | |
| 2017/0355558 | A1 | 12/2017 | Khalil et al. | |
| 2022/0055866 | A1 * | 2/2022 | La Croce | B66B 5/0031 |

FOREIGN PATENT DOCUMENTS

| | | |
|---|---|---|
| EP | 3187449 A1 | 7/2017 |

OTHER PUBLICATIONS

Extended European Search Report issued in European Application No. 24179723.2 dated Nov. 25, 2024; 7 pages.

* cited by examiner

*Primary Examiner* — Erick D Glass

(74) *Attorney, Agent, or Firm* — CANTOR COLBURN LLP

(57) ABSTRACT

An elevator system, having: an elevator car, a hoistway, and a pit; a sensor assembly, including a sensor configured to capture and process images; an elevator safety chain; wherein the sensor assembly is configured to: monitor in first sensing mode to detect whether an object is located in a first area of the elevator system; after the object is detected in the first area in the first sensing mode, monitor in a second sensing mode that is more sensitive than the first sensing mode to detect the object in the second sensitivity mode; and upon detecting the object in the second sensitivity mode, the elevator safety chain is opened by the sensor assembly to stop the elevator car.

20 Claims, 4 Drawing Sheets

MULTI-STAGE DETECTION TRIGGER FOR HUMAN SENSING

BACKGROUND

The embodiments herein relate to elevator safety systems and more particularly to a multi-stage detection trigger for human sensing.

Potential hazard conditions may exist in a hoistway because of a failure to take and maintain control of a car or counterweight. As a result, human sensing devices that open the elevator safety chain (e.g., cutting drive power and engaging the machine brake) may be installed in the hoistway and on top of the car in order to foolproof the system. In order to be effective, however these devices should be configured to avoid false positives, while maintaining adequate sensitivity to avoid false negatives.

SUMMARY

Disclosed is an elevator system, including: an elevator car, a hoistway, and a pit; a sensor assembly configured to capture and process images; an elevator safety chain; wherein the sensor assembly is configured to: monitor in first sensing mode to detect whether an object that is potentially human is located in a first area of the elevator system; after the object is detected in the first area in the first sensing mode, monitor in a second sensing mode that is more sensitive than the first sensing mode to detect the object in the second sensitivity mode; and upon detecting the object in the second sensitivity mode, the elevator safety chain is opened by the sensor assembly to stop the elevator car.

In addition to one or more aspects of the disclosed system, or as an alternate, the sensor assembly is mounted to the elevator car, which includes a top and the first area is the top of the elevator car.

In addition to one or more aspects of the disclosed system, or as an alternate, the sensor is a motion, depth or range sensor.

In addition to one or more aspects of the disclosed system, or as an alternate, the sensor is one of a LIDAR, RADAR, or a camera.

In addition to one or more aspects of the disclosed system, or as an alternate, the sensor is a millimeter wave RADAR or an RGBD camera.

In addition to one or more aspects of the disclosed system, or as an alternate, in the first sensing mode, the sensor captures images at a first frame rate and at a first spatial resolution; and in the second sensing mode, the sensor captures images at a second frame rate that is higher than the first frame rate and at a second spatial resolution that is higher than the first spatial resolution.

In addition to one or more aspects of the disclosed system, or as an alternate, in the second sensitivity mode, the sensing assembly focuses on areas or spatial volumes that, in the first sensitivity mode, included an image of the object.

In addition to one or more aspects of the disclosed system, or as an alternate, in the first sensing mode, the sensor assembly detects the object in the data stream when a size of the object is above a first threshold; and in the second sensing mode, the sensor assembly detects the object in the data stream from predetermined image features, and its presence in a number of image frames that is above a threshold.

In addition to one or more aspects of the disclosed system, or as an alternate, the system includes a plurality of sensors, including the sensor, distributed around the top of the elevator car, and wherein when the sensor captures image data that includes the object, the sensor assembly: instructs each of the plurality of sensors to operate in the second sensing mode; or instructs only the sensor to operate in the second sensing mode.

In addition to one or more aspects of the disclosed system, or as an alternate, upon entering the second sensing mode, the sensor assembly executes a countdown timer and returns to the first sensing mode upon failing to detect the object in the second sensing mode before the timer times-out.

Further disclosed is a method of controlling an elevator system having an elevator car, a hoistway and a pit, the method including: monitoring with a sensor assembly, that includes a sensor and is configured to capture and process images, in a first sensing mode to detect whether an object that is potentially human is located in a first area of the elevator system; monitoring, with the sensor assembly in a second sensing mode that is more sensitive than the first sensing mode, after the object is detected in the first area in the first sensing mode, to detect the object in the second sensing mode; and opening an elevator safety chain to stop the elevator car upon detecting the object in the second sensing mode.

In addition to one or more aspects of the disclosed method, or as an alternate, the sensor assembly is mounted to the elevator car, which includes a top and the first area is the top of the elevator car.

In addition to one or more aspects of the disclosed method, or as an alternate, the sensor is a motion, depth or range sensor.

In addition to one or more aspects of the disclosed method, or as an alternate, the sensor is one of a LIDAR, RADAR, or a camera.

In addition to one or more aspects of the disclosed method, or as an alternate, the sensor is a millimeter wave RADAR or an RGBD camera.

In addition to one or more aspects of the disclosed method, or as an alternate, in the first sensing mode, the sensor captures images at a first frame rate and at a first spatial resolution; and in the second sensing mode, the sensor captures images at a second frame rate that is higher than the first frame rate and at a second spatial resolution that is higher than the first spatial resolution.

In addition to one or more aspects of the disclosed method, or as an alternate, in the second sensitivity mode, the sensing assembly focuses on areas or spatial volumes that, in the first sensitivity mode, included an image of the object.

In addition to one or more aspects of the disclosed method, or as an alternate, in the first sensing mode, the sensor assembly detects the object in the data stream when a size of the object is above a first threshold; and in the second sensing mode, the sensor assembly detects the object in the data stream from predetermined image features, and its presence in a number of image frames that is above a threshold.

In addition to one or more aspects of the disclosed method, or as an alternate, a plurality of sensors, including the sensor, are distributed around the top of the elevator car, and wherein when the sensor captures image data that includes the object, the sensor assembly: instructs each of the plurality of sensors to operate in the second sensing mode; or instructs only the sensor to operate in the second sensing mode.

In addition to one or more aspects of the disclosed method, or as an alternate, upon entering the second sensing mode, the sensor assembly executes a countdown timer and returns to the first sensing mode upon failing to detect the object in the second sensing mode before the timer times-out. The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
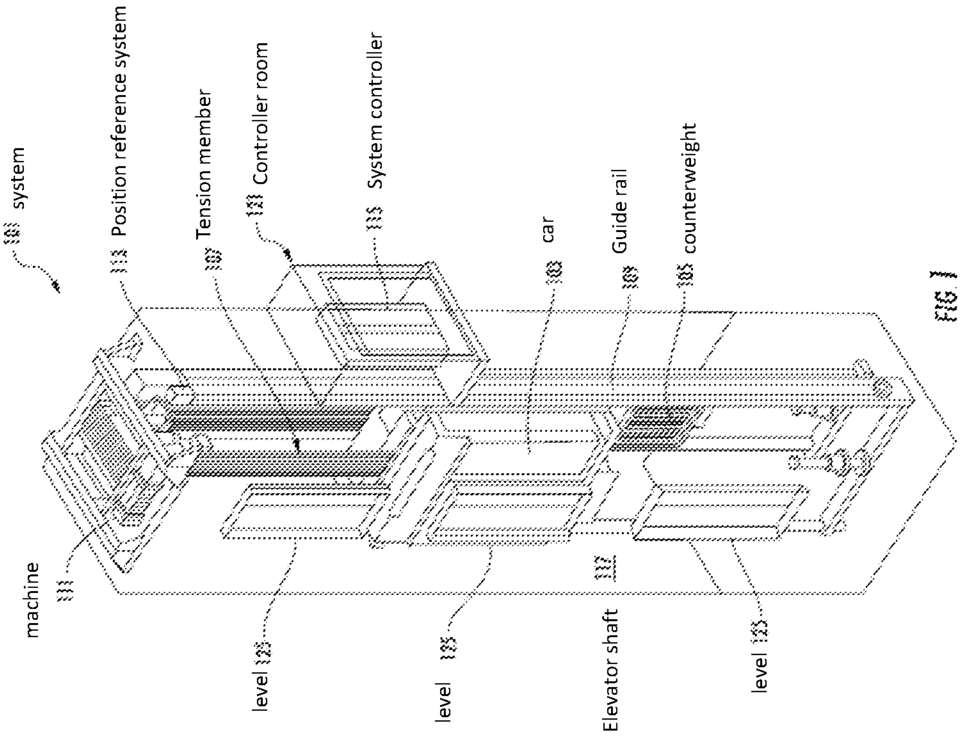
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111 (alternatively referred to as a drive), a position reference system 113, and a system controller 115, which may be utilized to control normal elevator car operations and active safety functions. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft or hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator shaft 117 and is configured to control the operation of the elevator system 101, and particularly the elevator car 103. It is to be appreciated that the controller 115 need not be in the controller room 121 by may be in the hoistway or other location in the elevator system. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator shaft 117 along guide rail 109, the elevator car 103 may stop at one or more landings 125 as controlled by the system controller 115. Although shown in a controller room 121, those of skill in the art will appreciate that the system controller 115 can be located and/or configured in other locations or positions within the elevator system 101. In one embodiment, the system controller 115 may be located remotely or in a distributed computing network (e.g., cloud computing architecture). The system controller 115 may be implemented using a processor-based machine, such as a personal computer, server, distributed computing network, etc.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

The elevator system 101 also includes one or more elevator doors 104. The elevator door 104 may be attached to the elevator car 103 or the elevator door 104 may be located on a landing 125 of the elevator system 101, or both. Embodiments disclosed herein may be applicable to both an elevator door 104 attached to the elevator car 103 or an elevator door 104 located on a landing 125 of the elevator system 101, or both. The elevator door 104 opens to allow passengers to enter and exit the elevator car 103.

Figure 2:
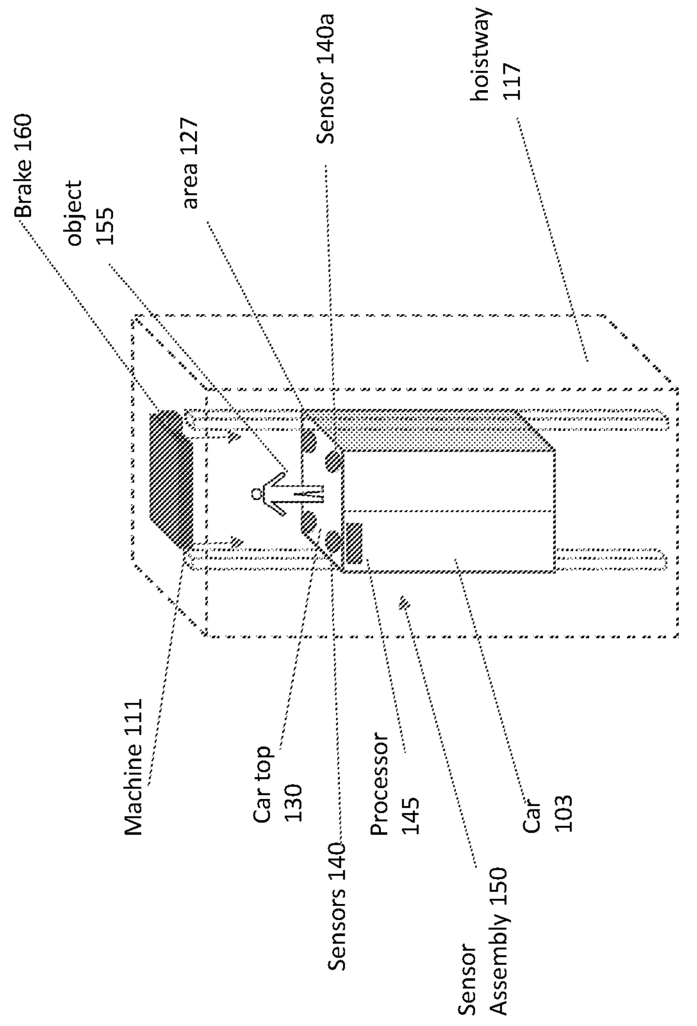
FIG. 2 shows additional aspects of the elevator system, configured with a plurality of motion sensors for detecting that an object that is potentially human is on top of the elevator car.

As shown in FIG. 2, the elevator car 10, in the hoistway 117 has a sensor assembly 150, which may include one or more sensors 140 and may further include or communicate with a processor 145, and which may capture and process images 142. The sensor assembly 150 has memory and communication circuitry so that it communicates, to e.g., the system controller 115 via an intelligent safety control system. The sensor assembly 150 may include link to a controllable relay that can be opened to open the safety chain. The connection to the safety chain could be via an electrical relay or via an intelligent safety control system via a communicated message to the elevator safety system, including the system controller 115.

Figure 3:
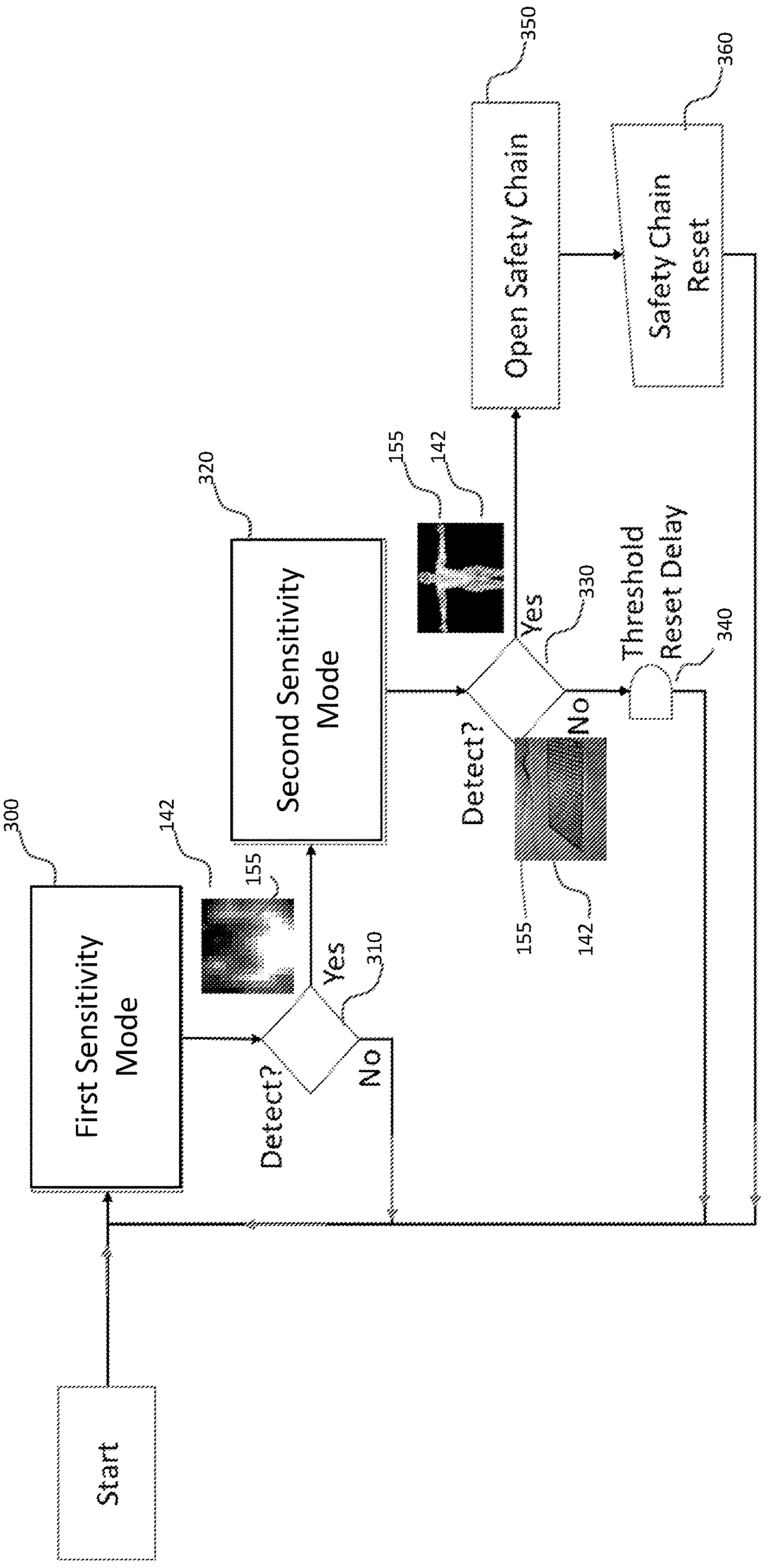
FIG. 3 is a flowchart for a process executed by the elevator system for detecting that an object is on top of the elevator car and responsively controlling the elevator car.

A car top 130 may be equipped with the sensors 140, including a first sensor 140*a*, that are operationally coupled with the processor 145. It is to be appreciated that other mounting configurations in the elevator system are within the scope of the disclosure. The sensors 140 may be motion sensors. The sensors 140, which may be range or depth sensors, may be LIDAR, RADAR such as millimeter wave RADAR, or a camera such as an RGBD camera. The sensor assembly 150 is configured to sense when an object 155 that is of concern, because of its size and movement that are indicative of it being potentially human, is above the elevator car 103 and open the elevator safety chain, resulting in cutting drive power from the machine 111 and engaging the machine brake 160. The sensor assembly 150 may alternatively be mounted elsewhere on the elevator car, such as the bottom, or the elevator system such as within the hoistway, the pit, including the pit ladder. Turning to FIG. 3, the flowchart shows the operation of the system 101 when detecting an object 155 is located on the car top 130, such as a vent grate. As shown block 300, sensor assembly 150 monitors for the object 155 on top 130 of the car 103 in a first sensitivity mode. It is to be appreciated that the concept of different sensitives applies to a range of Virtual Safety Nets (VSNs) or sensor assemblies 150.

The first sensitivity mode is a relatively lower sensitivity mode. In the first sensitivity mode, the sensors 140 are set to capture images 142 at a first, relatively lower, frame rate and at a first, relatively lower, spatial resolution. In addition, the sensor assembly 150 is configured such that, when analyzing the data stream 142, a first object size threshold is set at a larger setting and a first persistence threshold is relatively short.

Thus, the sensor assembly 150 would detect an object 155 if the object 155 located on the top 130 of the elevator car 103 is relatively large. Though the presence of the object 155 need only be captured in relatively few image frames.

While no object 155 is detected on the car top 130 ("no" at block 310), the sensor assembly 150 will continue to monitor at the first sensitivity level. If, during this activity, sensor data stream 142 includes an object 155 ("yes" at block 310) then, as shown in block 320, the sensor assembly 150 will monitor at a second sensitivity mode.

The second sensitivity mode is a higher sensitivity mode than the first sensitivity mode. In the second sensitivity mode, the sensors 140 are set to capture images 142 at a second frame rate that is higher than the first frame rate and at a second spatial resolution that is higher than the first spatial resolution. In addition, the sensor assembly 150 is set such that, when analyzing the data stream 142, a second object size threshold is set at a smaller setting than the first object size threshold and a second persistence threshold is longer than the first persistence threshold. The sensitivity mode factors (such as frame rate and spatial resolution) could also include areas or volumes of interest in the scanned region or plane, where the second sensitivity is used only in regions that pass the first detection gate 310.

Thus, in the second sensitivity mode, the sensor assembly 150 would detect the object 155 based on, e.g., it having a predetermined image features related to the object 155, e.g., other than or in addition to its size, resembling a human, and its presence being in a relatively larger number of image frames, e.g., above a threshold. Such features could include its motion, its appendages resembling arms, legs, a torso, a head, their sizes and relative motion to each other and the elevator car. Other features, such as a presence of personal gear, including hard hats and carried equipment, may also result in detecting the object. A benefit of this two-tiered sensitivity approach is that the increased resolution in time and spatial coordinates of the second sensitivity mode can also reduce the number of false positive results (i.e., when the sensor assembly 150 says there is a human but in fact there is not but the elevator operation is terminated).

While analyzing the object 155 in the data stream 142 in the second sensitivity mode, if the sensor assembly 150 is unable to detect the object 155 for period of time that is greater than a threshold ("no" at block 330), then at block 340 the sensor assembly 150 resets the sensitivity to the first sensitivity mode (block 300). Such process may include the sensor assembly 150 executing a countdown timer and returning to the first sensing mode upon failing to detect the object in the second sensing mode before the timer times-out. Otherwise, if the sensor assembly 150 is able to detect the object 155 in the second sensing mode ("yes" at block 330), at block 350 the safety chain is opened, to stop the machine 111 and engage the machine brake 160. Then at block 360, the sensor assembly 150 determines that the safety chain is reset, e.g., by action of a maintenance crew member. The sensor assembly 150 will then return to the first sensitivity mode and continues from block 300 as indicated above.

Figure 4:
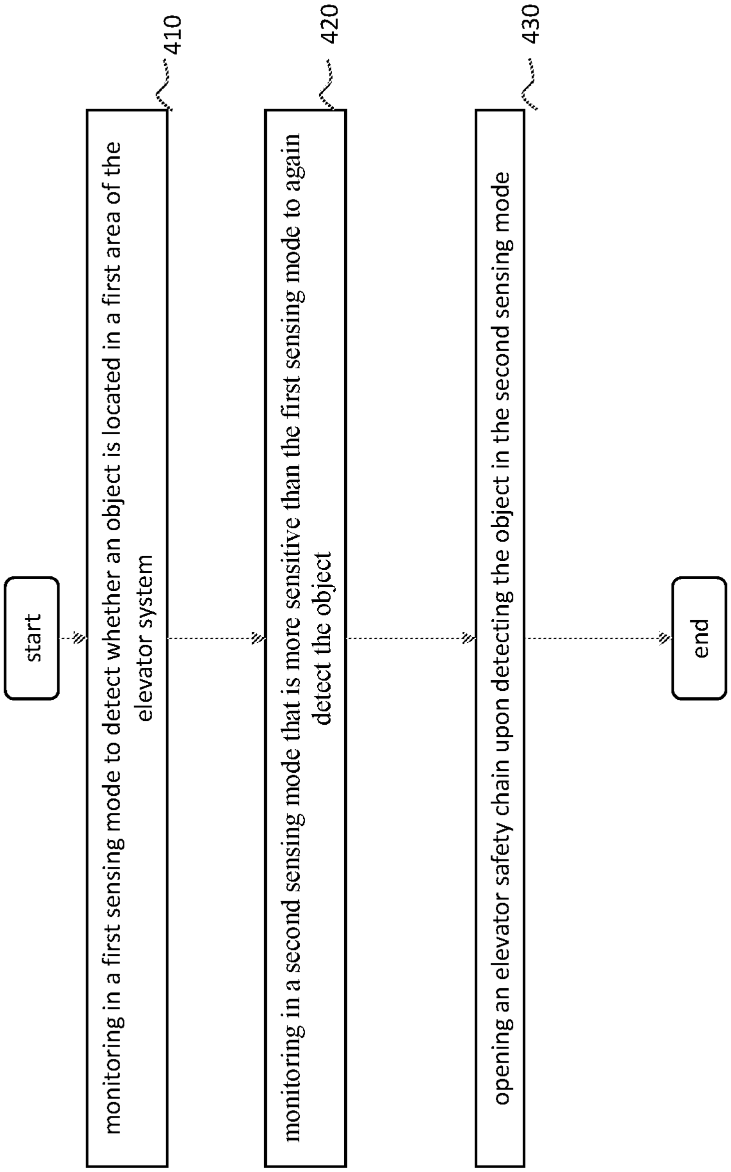
FIG. 4 is a flowchart generally showing the process executed by the elevator system for detecting that an object is on top of the elevator car and responsively controlling the elevator car.

FIG. 4 is a flowchart generally showing the process executed by the elevator system 101 for detecting an object 155 on top 130 of the elevator car 103 and responsively controlling the elevator car 103, e.g., to stop. As shown in block 410, the method includes monitoring, with the sensor assembly 150 that is mounted to the elevator car 103 and is operationally coupled to the system controller 115, in the first sensing mode to detect whether the object 155 is located in a first area 127 of the elevator system 101 that is exterior to the elevator car 103. As shown in block 420, the method includes monitoring, with the sensor assembly 150 in a second sensing mode that is more sensitive than the first sensing mode, after the object 155 is detected in the first area 127 in the first sensing mode, to detect the object 155 in the second sensing mode. As shown in block 430, the method includes opening an elevator safety chain to stop the elevator car 103 upon detecting the object 155 in the second sensing mode, which includes controlling a drive 111 and a machine brake 160 to stop the elevator car 103.

In one embodiment, the sensors 140 are distributed around a first area 127 that is exterior to the elevator car 103, and in one embodiment the first area 127 is a top 130 of the elevator car 103. The disclosed detection process can be applied to other areas of the elevator system 101, such as the pit area, ladder, etc.

If only the first sensor **140*a* captures images indicative of the object 155, the sensor assembly 150 may have each of the sensors 140 operate in the second sensing mode. Alternatively, to conserve resources, the sensor assembly 150 only have the first sensor 140*a*** operate in the second sensing mode.

In the disclosed embodiments, the object 155 must be detected one or both sensing modes before the elevator car 103 is stopped. The disclosed embodiments minimize instances in which the sensor assembly 150 falsely detects a human is on top of the elevator car, i.e., otherwise known as false positives, which could result from potentially detected events in the hoistway, including, e.g., counterweight motion, swinging traveling cables, rodents, reflections, debris, dust. The disclosed system, as indicated, normally operates under a first sensitivity mode, with a lower sensitivity setting, utilizing lower frame rates, lower spatial resolution, larger object size threshold, and a short persistence threshold. Once an object has been detected that passed the first threshold, the settings transition to the second sensitivity mode, which is a higher sensitivity mode, having a higher frame rate, a higher spatial resolution, a smaller object size threshold, and a longer persistence threshold.

It is within the scope of the embodiments to use convoluted neural networks (CNN) trained for identifying human shapes and motion. During the second sensitivity mode, the application of CNN detects the human presence, and then the safety chain is opened. Similarly machine learning, artificial intelligence, and other tools and methods for data analysis could be utilized. Sensing humans includes the detection of segments, limbs, digits and not necessarily whole humans. Depending on the sensing modality used and hoistway application zone, it is possible the system will not detect a whole human form.

Sensor data identified herein may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The sensor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz-typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system, comprising:

an elevator car, a hoistway, and a pit;

a sensor assembly configured to capture and process images;

an elevator safety chain;

wherein the sensor assembly is configured to:

monitor in first sensing mode to detect whether an object that is potentially human is located in a first area of the elevator system;

after the object is detected in the first area in the first sensing mode, monitor in a second sensing mode that is more sensitive than the first sensing mode to detect the object in the second sensitivity mode; and upon detecting the object in the second sensitivity mode, the elevator safety chain is opened by the sensor assembly to stop the elevator car.

2. The system of claim 1, wherein the sensor assembly is mounted to the elevator car, which includes a top and the first area is the top of the elevator car.

3. The system of claim 1, wherein the sensor is a motion, depth or range sensor.

4. The system of claim 1, wherein the sensor is one of a LIDAR, RADAR, or a camera.

5. The system of claim 1, wherein the sensor is a millimeter wave RADAR or an RGBD camera.

6. The system of claim 1, wherein:

in the first sensing mode, the sensor captures images at a first frame rate and at a first spatial resolution; and in the second sensing mode, the sensor captures images at a second frame rate that is higher than the first frame rate and at a second spatial resolution that is higher than the first spatial resolution.

7. The system of claim 6, wherein in the second sensitivity mode, the sensing assembly focuses on areas or spatial volumes that, in the first sensitivity mode, included an image of the object.

8. The system of claim 6, wherein:

in the first sensing mode, the sensor assembly detects the object in the data stream when a size of the object is above a first threshold; and in the second sensing mode, the sensor assembly detects the object in the data stream from predetermined image features, and its presence in a number of image frames that is above a threshold.

9. The system of claim 2, comprising a plurality of sensors, including the sensor, distributed around the top of the elevator car, and wherein when the sensor captures image data that includes the object, the sensor assembly:

instructs each of the plurality of sensors to operate in the second sensing mode; or instructs only the sensor to operate in the second sensing mode.

10. The system of claim 1, wherein upon entering the second sensing mode, the sensor assembly executes a countdown timer and returns to the first sensing mode upon failing to detect the object in the second sensing mode before the timer times-out.

11. A method of controlling an elevator system having an elevator car, a hoistway and a pit, the method comprising:

monitoring with a sensor assembly, that includes a sensor and configured to capture and process images, in a first sensing mode to detect whether an object that is potentially human is located in a first area of the elevator system;

monitoring, with the sensor assembly in a second sensing mode that is more sensitive than the first sensing mode, after the object is detected in the first area in the first sensing mode, to detect the object in the second sensing mode; and opening an elevator safety chain to stop the elevator car upon detecting the object in the second sensing mode.

12. The method of claim 11, wherein the sensor assembly is mounted to the elevator car, which includes a top and the first area is the top of the elevator car.

13. The method of claim 11, wherein the sensor is a motion, depth or range sensor.

14. The method of claim 11, wherein the sensor is one of a LIDAR, RADAR, or a camera.

15. The method of claim 11, wherein the sensor is a millimeter wave RADAR or an RGBD camera.

16. The method of claim 11, wherein:

in the first sensing mode, the sensor captures images at a first frame rate and at a first spatial resolution; and in the second sensing mode, the sensor captures images at a second frame rate that is higher than the first frame rate and at a second spatial resolution that is higher than the first spatial resolution.

17. The method of claim 16, wherein in the second sensitivity mode, the sensing assembly focuses on areas or spatial volumes that, in the first sensitivity mode, included an image of the object.

18. The method of claim 16, wherein:

in the first sensing mode, the sensor assembly detects the object in the data stream when a size of the object is above a first threshold; and in the second sensing mode, the sensor assembly detects the object in the data stream from predetermined image features, and its presence in a number of image frames that is above a threshold.

19. The method of claim 12, wherein:

a plurality of sensors, including the sensor, are distributed around the top of the elevator car, and wherein when the sensor captures image data that includes the object, the sensor assembly:

instructs each of the plurality of sensors to operate in the second sensing mode; or instructs only the sensor to operate in the second sensing mode.

20. The method of claim 11, wherein upon entering the second sensing mode, the sensor assembly executes a countdown timer and returns to the first sensing mode upon failing to detect the object in the second sensing mode before the timer times-out.

* * * * *